Feb. 20, 1940. H. B. RAPP 2,191,098
DISK HARROW CONSTRUCTION
Filed Sept. 6, 1938
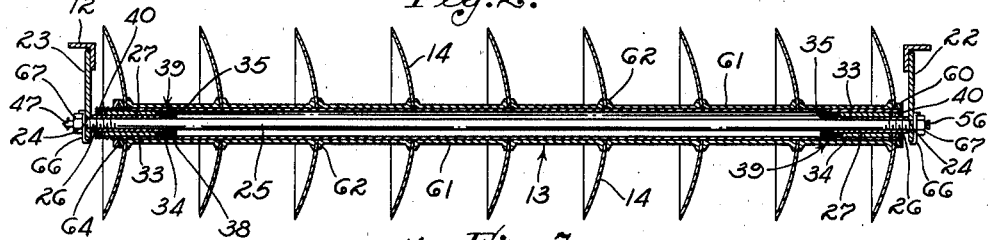
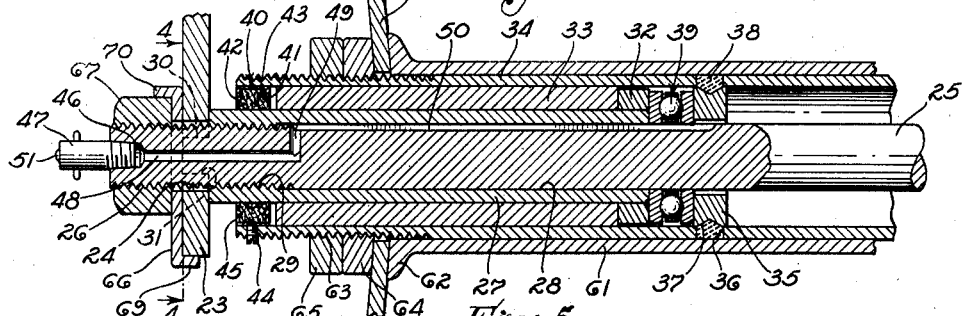
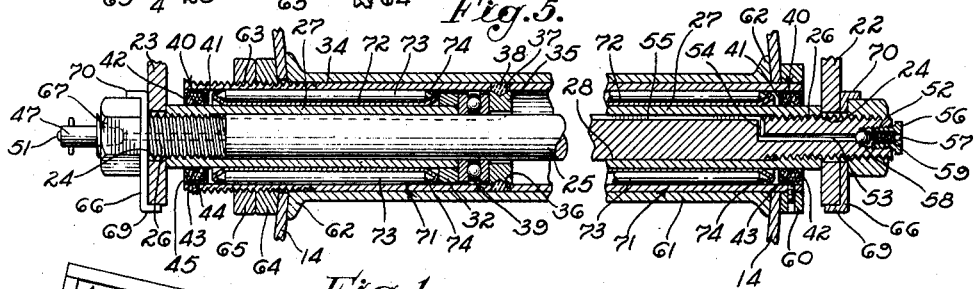
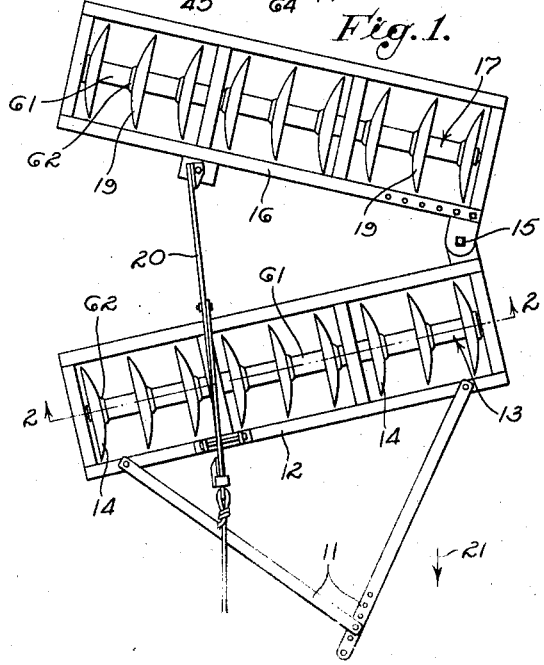
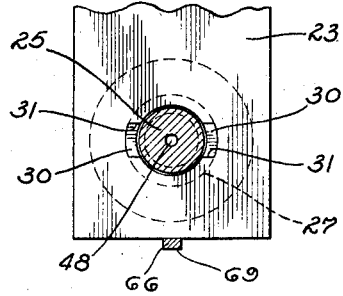
INVENTOR
HOWARD B. RAPP
BY HARRIS, KIECH, FOSTER & HARRIS
FOR THE FIRM
ATTORNEYS.

Patented Feb. 20, 1940

2,191,098

UNITED STATES PATENT OFFICE 2,191,098

DISK HARROW CONSTRUCTION

Howard B. Rapp, Santa Ana, Calif., assignor to Howard B. Rapp and Sally Rapp, copartners doing business as Towner Manufacturing Co., Santa Ana, Calif.

Application September 6, 1938, Serial No. 228,535

9 Claims. (Cl. 97—220)

My invention relates to disk harrows and, more particularly, to the construction by which the disks are mounted upon the axles of the implement.

In disk harrows in which a plurality of disks are rotatably mounted with regard to a supporting axle and the implement is drawn in a direction which is not perpendicular to the axle, a very considerable thrust is exerted by the soil upon the disks, tending to move them along the axle parallel to the axis thereof. Among the objects of my invention is the provision of a thrust bearing for resisting this force which is wear-resistant, simple to manufacture, constructed largely of stock parts, easy to adjust, and which may be quickly and thoroughly lubricated.

Other objects include the construction of a disk harrow having a thrust bearing construction such that the entrance of dirt between the bearing faces is prevented, and such that the parts which are subjected to wear may be easily replaced.

Other objects and advantages of the invention will be made apparent in the following specification which may be better understood with reference to the accompanying drawing in which, Fig. 1 is a diagrammatic view of a two-gang disk harrow;

Fig. 2 is a fragmentary sectional view taken as indicated on the line 2—2 of Fig. 1;

Fig. 3 is a sectional view of the left end of the bearing construction illustrated in Fig. 2;

Fig. 4 is a sectional view taken as indicated by the line 4—4 of Fig. 3; and

Fig. 5 is a fragmentary view of a modified form of my bearing construction.

While my invention may be utilized with various implements and devices and may be employed on a harrow having more than four gangs, I have for illustrative purposes shown in Fig. 1 a two-gang disk harrow. Such a harrow includes draw bars 11 connected to a forward frame 12 in which there is mounted an axle 13 upon which are placed a plurality of disks 14. The front frame 12 is connected through a pivot 15 to a rear frame 16 to which is secured an axle 17 supporting a plurality of disks 19. The disks 14 and 19 are concavo-convex, the disks 14 of the front frame having their convex sides toward the pivot 15, and the disks 19 of the rear gang having their concave sides toward the pivot 15. The frames 12 and 16 may be connected by a stay bar 20 pivotally secured to the rear frame and adjustably connected to the front frame to maintain the gangs in the desired relative angle. The path of travel of the implement being as indicated by the arrow 21, the resistance of the soil to the concave sides of the disks 14 and 19 exerts a very considerable thrust tending to move the disks along the axle upon which they are supported.

Referring to Fig. 2, the numerals 22 and 23 indicate the right and left side members of a harrow frame which may be the front frame 12. Each of the members 22 and 23 has an opening 24 therein in which an axle 25 is supported. The axle 25 may be a solid cylindrical rod and is provided at each end with threads 26. Thrust sleeves 27, having an inner cylindrical bore 28 of slightly larger diameter than the axle 25 and having interior threads 29 at one end thereof, are threaded one upon each end of the axle 25 so that each is adjacent one of the side members 22 or 23 of the frame. At its threaded end, each of the thrust sleeves 27 is provided with projections 30 which extend into openings 31 formed in one of the side members 22 or 23 of the frame and connect with the opening 24 therein so that the thrust sleeves 27 are secured against rotation. Flush with the other end of each of the thrust sleeves 27 is a bearing ring 32 which is secured to the outer wall of the thrust sleeve in any suitable manner, as by welding. The bearing 32 is preferably formed of hardened metal.

Rotatably disposed upon each of the thrust sleeves 27 is a cylindrical bearing sleeve 33 having an inner diameter slightly larger than the external diameter of the thrust sleeve 27 and an external diameter slightly larger than the external diameter of the bearing ring 32. Rotatably mounted upon the bearing sleeves 33 is a tubular member 34 having an inner diameter slightly larger than the external diameter of the bearing sleeves 33 and of a length such that it projects beyond the outer ends of the bearing sleeves 33.

Two bearing blocks 35, which may be annular in form, are secured to the interior of the tubular member 34. These bearing blocks may be secured to the tubular member 34 by forming openings 36 in the tubular member and providing a cavity 37 in the bearing block 35 corresponding thereto so that the block and member may be secured by a weld 38. The bearing blocks 35 are preferably formed of a hardened wear-resistant metal. Disposed between each of the bearing blocks 35 and the adjacent bearing ring 32 is a roller or ball bearing 39, the external diameter of which may be somewhat less than the internal diameter of the tubular member 34.

Disposed within the tubular member 34 adjacent each end thereof is a packing member 40 having annular grooves 41 and 42 in its inner and outer faces, respectively, and an annular groove 43 centrally disposed in its inner peripheral wall so that a force parallel to the axis of the axle 25 in either direction tends to cause a deformation of the packing member 40 to more tightly grip the axle 25. The packing member 40 may be secured to the tubular member 34, so that it rotates therewith, by a set screw 44 threaded through the tubular member 34 and into a metal band 45 confining the outer portion of the bearing member.

Formed in one end of the axle 25 is a threaded cavity 46 communicating with a longitudinal passage 48 and adapted to receive a lubricant nipple 47. At its inner end, the longitudinal passage 48 communicates with a radial passage 49 which connects with a longitudinal groove 50 formed in the surface of the axle 25. The groove 50 terminates adjacent the rear of the thrust block 35. The lubricant nipple 47 may be of conventional construction having a passage therethrough normally closed by a ball 51 actuated by a compression spring, not shown. Lubricant under pressure may be forced through the lubricant nipple 47 and the passages 48 and 49 and the groove 50 to fill the space between the axle 25 and the tubular member 34, and the space between the thrust sleeve 27 and the tubular member 34, so that the roller or ball bearing 39 and the bearing sleeve 33 are submerged in the lubricant.

The other end of the axle 25 may be provided with a threaded cavity 52 communicating with a longitudinal passage 53 which is connected by a radial passage 54 to a longitudinal groove 55 in the wall of the axle 25. The groove 55 terminates adjacent the nearer thrust block 35. Threaded into the cavity 52 is a fitting 56 having a passage 57 therethrough and a ball 58 therein normally retained in position to close the passage by a spring 59. When lubricant is being supplied to the interior of the bearing construction through the lubricant nipple 47 and the pressure of lubricant or air between the tubular member 34 and the axle 25 exceeds a predetermined value, the spring 59 is compressed, permitting the ball 58 to move to the right and air or lubricant to be expelled through the fitting 56.

Secured to the tubular member 34 at one end thereof in any suitable manner, as by welding, is an annular ring 60. One of the disks 14 is placed against the annular ring 60 with its convex side adjacent thereto. A spacing spool 61, having enlarged ends 62, is positioned upon the tubular member 34 in engagement with the installed disk 14. A second one of the disks 14 is then positioned upon the tubular member 34 against the spacing sleeve 61 and the disks 14 and sleeves 61 are alternated along the tubular member 34. The left end of the tubular member 34 is provided with external threads 63 upon which a nut 64 is threaded against one of the disks 14 to secure the disks 14 and spacing spools 61 firmly upon the tubular member 34 and against the annular ring 60. A lock nut 65 may be threaded against the nut 64.

A lock washer 66 is placed upon each end of the axle 25 adjacent the outer face of the frame side members 22 and 23, and a nut 67 is threaded on the axle against each of the lock washers 66. As illustrated in the drawing, a portion of each lock washer 66 may be bent around the frame side member 22 or 23, as indicated by the numeral 69, and another portion of the lock washer, indicated by the numeral 70, may be bent around the nut 67 to lock the nut 67 against rotation.

The disks may be assembled in an identical manner upon the axle 17 of the rear frame 16. With the frames in their angled position, as illustrated in Fig. 1, as the harrow is drawn forwardly, a very considerable thrust is exerted upon the disks, tending to move the disks and the tubular members 34 along the axles 25. In the front gang, this thrust is taken by the thrust bearing adjacent the left end of the axle, and in the rearward gang, this thrust is taken by the thrust bearing adjacent the right end of the axle. It will be apparent that, by threading the thrust sleeves 27 to the left or to the right upon the axle 25, the tubular member 34 and the disks which are secured thereto, can be shifted to the left or right relative to the axle 25 and the harrow frame in order to rotate the disks in the proper position relative to their frame and in proper spaced relationship with the disks of the other frame. Likewise, if the thrust blocks 35 or bearing rings 32 become worn, it is possible to advance the thrust sleeves 27 toward each other upon the axle 25 to compensate for this wear. The packing members 40 substantially prevent the entrance of dirt into the bearing construction. Any small amount of earth or sand that should pass the bearing members 40 must pass through the body of lubricant the full length of the bearing sleeves 27 in order to reach the ball or roller bearings 39, so that the presence of foreign matter in the lubricant adjacent these bearings is practically prevented.

In Fig. 5 is shown a modified construction in which parts similar to those previously described and illustrated are indicated by corresponding numbers. This construction differs from the construction hereinbefore set forth in that there is substituted for the bearing sleeve 33 a ball or roller bearing 71. If a roller bearing is employed, it may be of the needle-bearing type including a shell 72 and having mounted therein rollers 73 with tapered ends, as indicated by the numeral 74. This construction provides rolling contact with the tubular sleeve 34 during its rotation, as distinguished from the sliding contact provided for in the embodiment of my invention first described herein.

The tubular member 34 and the bearing sleeves 33 may be formed of stock tubing, and the thrust sleeves 27 to which the thrust rings 32 are secured may, likewise, be formed of stock tubing. The shop work required to adapt ordinary cylindrical rod to the form shown for the axle 25 is small. Since the axle 25 is not subjected to contact with any moving parts, it will not require replacement. Should the bearing blocks 35 or bearing rings 32 require replacement, this may be easily, quickly, and inexpensively done.

While that embodiment of my invention hereinbefore illustrated and described is capable of performing the objects and providing the advantages primarily stated, there are various other embodiments of my invention likewise capable of performing these objects and providing these advantages, and I, therefore, wish my invention to be understood as not restricted to the form herein shown.

I claim as my invention:

1. In a bearing construction for a disk harrow having a frame, an axle non-rotatably attached thereto, and a tubular member rotatable upon the axle and adapted to carry a plurality of disks, the combination of: a thrust block attached to the interior of the tubular member; a thrust sleeve around the axle and associated with the axle and frame whereby it is restrained against rotation and is adjustable for axial movement relative to said axle, said sleeve having a reduced portion with an outer diameter less than the inner diameter of the tubular member and an enlarged inner end cooperating with said block to provide a thrust bearing; a rotary bearing member on the reduced portion of said thrust sleeve; and packing means defining a lubricant chamber between the axle and tubular member containing said thrust block, said enlarged end of said thrust sleeve and said rotary bearing member.

2. In a disk harrow including a frame, an axle non-rotatably attached to the frame, and a plurality of disks, the combination of: a tubular member on the axle adapted for supporting the disks in spaced relationship; two bearing blocks attached to the interior of said tubular member; two thrust sleeves surrounding the axle and secured thereto, each of said sleeves having an enlarged end portion adjacent one of said thrust blocks and a reduced portion; a thrust bearing member comprising a roller bearing between each thrust block and the enlarged end portion of the adjacent thrust sleeve; a rotary bearing member comprising a sleeve supported upon the reduced portion of each of said thrust sleeves and rotatable relative thereto and rotatable relative to said tubular member; packing means between said tubular member and said thrust sleeves defining a lubricant chamber; and means for introducing lubricant through the axle into said chamber to lubricate said thrust bearing members and said rotary bearing members.

3. In a disk harrow including frame members, an axle non-rotatably secured to the frame members, and a plurality of disks, the combination of: a tubular member around the axle for supporting the disks; a bearing block attached to the interior of said tubular member; a thrust sleeve mounted upon the axle having a thrust face adjacent one end thereof; a radial bearing including a plurality of rotary bearing elements between said thrust sleeve and said tubular member; a thrust bearing including a plurality of rotary bearing elements between said thrust face and said bearing block; packing means defining a lubricant chamber between said tubular member and the axle; a lubricant supply passage in the axle communicating with said chamber; and a fluid discharge passage communicating with said chamber.

4. In a disk harrow including frame members, an axle non-rotatably secured to the frame members, and a plurality of disks, the combination of: a tubular member around the axle for supporting the disks; a bearing block attached to the interior of said tubular member near one end thereof; a thrust sleeve mounted upon the axle having a thrust face adjacent one end thereof; a radial bearing including a plurality of rotary bearing elements between said thrust sleeve and said tubular member; a thrust bearing including a plurality of rotary bearing elements between said thrust face and said bearing block; packing means defining a lubricant chamber between said tubular member and the axle; a lubricant supply passage in the axle communicating with said chamber; a fluid discharge passage communicating with said chamber; and closure means in said discharge passage adapted to pass fluid therethrough when the fluid pressure in said chamber exceed a predetermined value.

5. In a bearing construction for a disk harrow having a frame, an axle non-rotatably attached thereto, and a tubular member rotatable upon the axle and adapted to carry a plurality of disks, the combination of: a thrust block attached to the interior of the tubular member; a thrust sleeve around the axle and associated with the axle and frame whereby it is restrained against rotation and is adjustable for axial movement relative to said axle, said sleeve having a reduced portion with an outer diameter less than the inner diameter of the tubular member and an enlarged inner end cooperating with said block to provide a thrust bearing; a rotary bearing member on the reduced portion of said sleeve and adjacent said enlarged end of the sleeve to be limited thereby in axial movement in one direction; an annular retaining member fixed to the interior of said tubular member to rotate therewith and to limit axial movement of said bearing member in the other direction; and annular packing means carried by said retaining member and embracing said axle to define a lubricant chamber between the axle and tubular member containing said block, thrust sleeve, and rotary member.

6. A combination as set forth in claim 5 in which said retaining member provides two spaced flanges that extend radially inward toward said axle and confine said packing means.

7. A combination as set forth in claim 5 in which a roller bearing is provided between said thrust block and thrust sleeve and in which a lubricant channel to the roller bearing is provided in said axle.

8. In a disk harrow including a frame and an axle non-rotatably attached thereto for carrying a plurality of disks, the combination of: a tubular member disposed around the axle and adapted to support the disks in spaced relationship; two thrust blocks attached to the interior of said tubular member, said two thrust blocks defining with said tubular member and axle a central annular lubricant storage space; two thrust sleeves surrounding the axle, each sleeve having an enlarged end disposed axially inward toward the corresponding one of said thrust blocks to cooperate therewith and having a reduced outer end; means securing said sleeves against rotation relative to the axle; a rotary bearing member on the reduced end of each of said thrust sleeves against the enlarged end thereof; an annular retaining member fixed to the interior of said tubing member adjacent the outer end of each of said rotary members to limit outward axial movement of the bearing member; and annular packing means carried by each of said retaining members and embracing said axle, said axle being cut away to provide a lubricant supply passage from one of its ends to said lubricant storage space and a lubricant discharge passage from said lubricant storage space to the other of its ends.

9. A combination as set forth in claim 8 in which a series of rotary bearing elements is interposed between each of said thrust blocks and the adjacent thrust sleeve and in which each of said passages communicates with one of said series of bearing elements, each of said enlarged ends of the thrust sleeves being constructed to permit lubricant to flow from the space containing the corresponding series of bearing elements to the corresponding one of said rotary bearing members.

HOWARD B. RAPP.